（12）United States Patent
Alpert

(10) Patent No.: US 10,313,888 B2
(45) Date of Patent: Jun. 4, 2019

(54) METHODS AND DEVICES FOR CHANNEL SELECTION AND ACCESS COORDINATION

(71) Applicant: Intel Corporation, Santa Clara, CA (US)

(72) Inventor: Yaron Alpert, Petah Tikva (IL)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 15/282,770

(22) Filed: Sep. 30, 2016

(65) Prior Publication Data

US 2018/0098336 A1 Apr. 5, 2018

(51) Int. Cl.
*H04W 72/12* (2009.01)
*H04W 16/10* (2009.01)
*H04W 84/12* (2009.01)

(52) U.S. Cl.
CPC .......... *H04W 16/10* (2013.01); *H04W 84/12* (2013.01)

(58) Field of Classification Search
CPC .......... H04W 28/20; H04W 72/1205; H04W 72/1278; H04W 84/12; H04W 84/04; H04W 88/06; H04L 12/4604
USPC .......................................... 370/338
See application file for complete search history.

(56) References Cited

U.S. PATENT DOCUMENTS

| 8,848,679 B2 * | 9/2014 | Oerton | H04W 24/02 370/338 |
| 9,622,218 B2 * | 4/2017 | Lee | H04W 72/04 |
| 2003/0198200 A1 | 10/2003 | Diener et al. | |
| 2006/0153138 A1 * | 7/2006 | Asoh | H04W 48/20 370/332 |
| 2008/0188186 A1 | 8/2008 | Hwang et al. | |
| 2009/0034457 A1 * | 2/2009 | Bahl | H04W 16/10 370/329 |
| 2009/0129338 A1 | 5/2009 | Horn et al. | |
| 2010/0097952 A1 | 4/2010 | McHenry et al. | |
| 2011/0188544 A1 | 8/2011 | Ponnuswamy | |
| 2012/0163223 A1 * | 6/2012 | Lo | H04L 5/0007 370/252 |
| 2013/0058310 A1 * | 3/2013 | Park | H04W 72/082 370/331 |
| 2013/0215863 A1 | 8/2013 | Sun et al. | |
| 2014/0094122 A1 * | 4/2014 | Etemad | H04W 76/14 455/41.2 |
| 2014/0307571 A1 * | 10/2014 | Herzen | H04W 24/02 370/252 |

(Continued)

OTHER PUBLICATIONS

Search Report dated Jan. 5, 2018 for International Application No. PCT/US2017/050479.

*Primary Examiner* — Robert J Lopata
(74) *Attorney, Agent, or Firm* — Schiff Hardin LLP

(57) ABSTRACT

This disclosure relates to a method for primary channel selection by a first access point type communication device (AP) of a group of APs, the method comprising: detecting, by the first AP, a central frequency location and a bandwidth of a primary channel selected by at least one second AP of the group of APs; selecting, by the first AP, a central frequency location and a bandwidth of a primary channel for the first AP, wherein the selection of the central frequency location and bandwidth of the primary channel for the first AP is based on the detected central frequency location and bandwidth of the primary channel for the at least one second AP.

10 Claims, 16 Drawing Sheets

(56) References Cited

U.S. PATENT DOCUMENTS

| | | | |
|---|---|---|---|
| 2014/0307634 A1* | 10/2014 | Lee | H04W 16/14 370/329 |
| 2015/0163769 A1* | 6/2015 | Lee | H04W 72/04 370/329 |
| 2016/0044533 A1* | 2/2016 | Seok | H04L 5/0007 370/330 |
| 2016/0088631 A1* | 3/2016 | Hedayat | H04W 16/14 370/329 |
| 2016/0197655 A1* | 7/2016 | Lee | H04B 7/024 370/338 |
| 2016/0233929 A1 | 8/2016 | van Zelst et al. | |
| 2016/0374078 A1* | 12/2016 | Ghosh | H04W 16/10 |
| 2017/0055291 A1* | 2/2017 | Gorokhov | H04W 72/1215 |
| 2017/0303220 A1* | 10/2017 | Sadeghi | H04L 5/0053 |
| 2018/0102816 A1* | 4/2018 | Lee | H04B 7/024 |

* cited by examiner

METHODS AND DEVICES FOR CHANNEL SELECTION AND ACCESS COORDINATION

FIELD

The disclosure relates to a method and a device for primary channel selection by access point type communication devices (APs) of a group of APs, in particular multiple basic service sets (M-BSSs) and multiple virtual APs (multi VAPs) according to a wireless communication standard such as IEEE 802.11 WiFi. The disclosure further relates to a method and device for open and closed loop coordinating access of such devices to a transmission medium.

BACKGROUND

The IEEE 802.11 is expected to support Basic Service Set Identification (BSSID) operation in order to successfully establish connectivity and exchange information from APs 100 to a large number of STAs 120 with a different link and QoS characteristic via multiple-VAPs (virtual APs)/co-located APs (virtual APs with a different BSSID) as illustrated in FIG. 1. When M-BSS AP is operating at full and/or partial overlapping channel bands the Overlapping BSS (OBSS) problem occurs. OBSS problem refers to situations in which two or more BSSs 111, 112, unrelated to each other, are operating in the same overlapping channel and are close enough to hear and to interfere with each other physically 130, in particular when some STAs 121 or AP from one BSS 111 are able to receive frames from the other BSS 112. Hence, the transmissions 124 by some STAs 122 in one BSS 112 will affect some STAs 121 of other BSS 111. This is usually called the OBSS problem. The OBSS problem may degrade the overall network system performance severely for one or more reasons: Due to the doubling of the effective number of STAs, the medium contention level increases dramatically; interference occurs during the OBSS; Interference makes it difficult for a wireless network to provide robust performance and leads to transient failures. Hence, the STAs cannot receive and decode the frames correctly. The expansion of the hidden STAs in both BSSs due the OBSS increases severely the probability of collisions. Therefore multiple co-channel Wi-Fi APs (M-BSS/M-VAPs) overlapping in coverage are generally considered undesirable because members of the overlapping channel bands compete for channel access, which typically increases the contention level of wireless medium access and reduces the overall system performance. There is a need to find a solution for the above described OBSS problem in order to increase the M-BSS performances.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
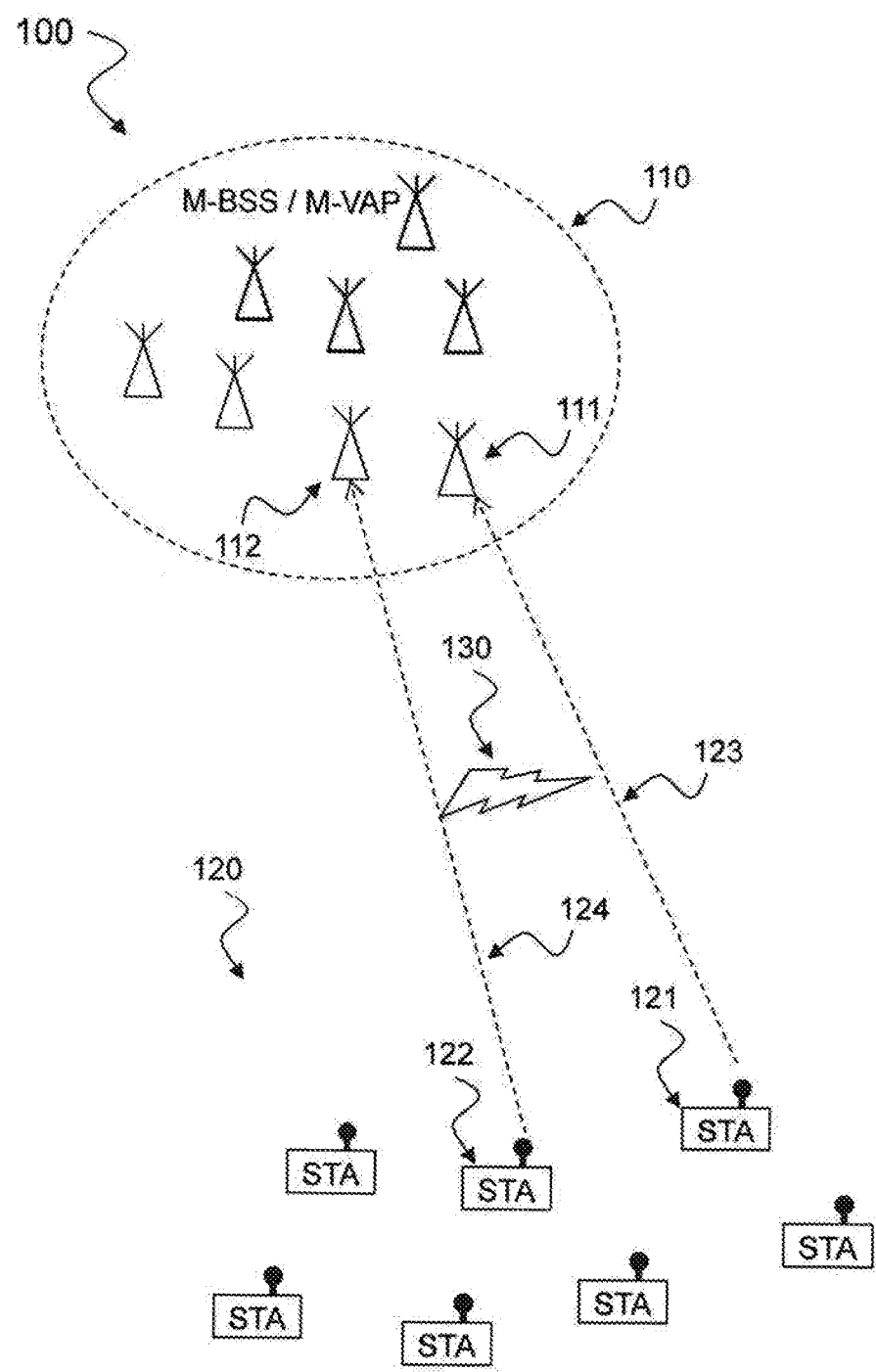
FIG. 1 is a schematic diagram of a wireless communication system illustrating the Overlapping BSS (OBSS) Problem.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
BSS: Basic Service Set
BSSID: Basic Service Set Identification
AP: Access Point VAP: Virtual Access Point
STA: Station, wireless device
M-BSS: multi BSSIDs
M-VAP: multi VAPs
PHY: physical device
MAC Medium Access Control
BW: bandwidth
CSMA/CA: Carrier Sense Multiple Access/Collision Avoidance
NAV Network Allocation Vector
OBSS: Overlapping BSS
DCAC: Dynamic Channel Access Coordination
TXOP: Transmission opportunity
PPDU: PLCP Protocol Data Unit
PLCP: Physical Layer Convergence Procedure The IEEE 802.11 is expected to support Basic Service Set Identification (BSSID) operation in order to successfully establish connectivity and exchange information from APs to a large number of STAs with a different link conditions and QoS characteristic via multiple-VAPs (virtual APs)/co-located APs (virtual APs with a different BSSID). The techniques described hereinafter improve M-BSS performance in multi VAP (multi BSS) usage scenarios. Note that the Multi-BSSIDs (M-BSS)/Multi-VAPs (M-VAP) can be allocated to the same device or to a set of distributed devices.

A Virtual AP (VAP/BSSID) is a logical entity that resides within a physical Access Point (AP) and caters to unique requirements of various STA groups service types and encryption types (i.e. using a single PHY interface to an STA, the VAP appears as an independent AP with its own unique SSID or MAC address). A VAP is a multiplexed instantiation of a single physical AP so that it represents itself over the air (access medium) as a discrete AP.

The methods and devices according to the disclosure support Co-located multiple IEEE 802.11 (Wi-Fi) APs dynamic bandwidth channel access and simultaneous operation as described hereinafter.

The methods and devices described herein may be implemented in wireless communication networks, in particular communication networks based on high speed communication standards from the 802.11 family according to the WiFi alliance, e.g. 802.11ac, ad, ax, ay and successor standards. The methods are also applicable for other wireless or mobile communication standards in particular standards that use CSMA/CA with overlapping channel, 3 GPP LTE-U for example. The methods and devices described below may be implemented in electronic devices such radio cells or access points (APs) according to the IEEE 802.11 notation or in mobile or wireless devices or stations (STAs) according to the IEEE 802.11 notation, in particular in radio controllers and/or transceivers of such devices. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals and to perform associated signal processing. Radio signals may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

Figure 2:
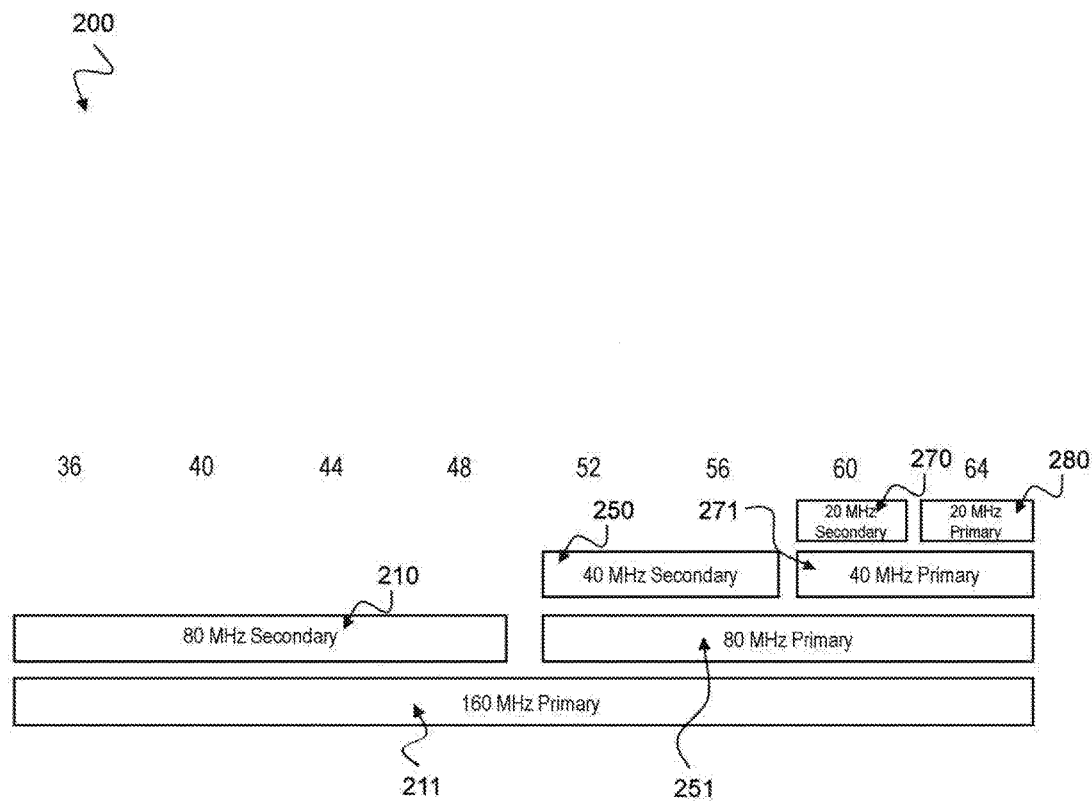
FIG. 2 is a schematic diagram illustrating an exemplary bandwidth scheme 200 according to the IEEE 802.11 (WiFi) standard.

FIG. 2 is a schematic diagram illustrating an exemplary bandwidth scheme 200 according to the IEEE 802.11 (WiFi) standard.

IEEE 802.11 standard utilizes four 20 MHz channel bands in order to increase the data transmission rates. To help with dividing up airtime between channels, 802.11 introduces the terminology of primary and secondary (or, more formally, non-primary) channels. One of the 20 MHz channel is assigned as a primary channel that can perform full Carrier Sense Multiple Access/Collision Avoidance (CSMA/CA) and the Network Allocation Vector (NAV) tracking and the rest of other channels are assigned as secondary channels that only have capability of CCA (clear channel assessment).

FIG. 2 shows a primary 20 MHz channel 280 and a secondary 20 MHz channel 270, a primary 40 MHz channel 271 and a secondary 40 MHz channel 250, a primary 80 MHz channel 251 and a secondary 80 MHz channel 210 and a single primary 160 MHz channel 211.

Note: For each channel bandwidth, there is one primary channel, meaning that it is the channel used to transmit frames at that channel width. This network will transmit 20 MHz frames on channel 64. To transmit a 40 MHz frame on its 40 MHz primary channel, both channels 60 and 64 must be free. To transmit an 80 MHz frame, the four channels 52 through 64 must all be free. Finally, to transmit a 160 MHz frame, all eight channels from 36 through 64 must be free.

Figure 3:
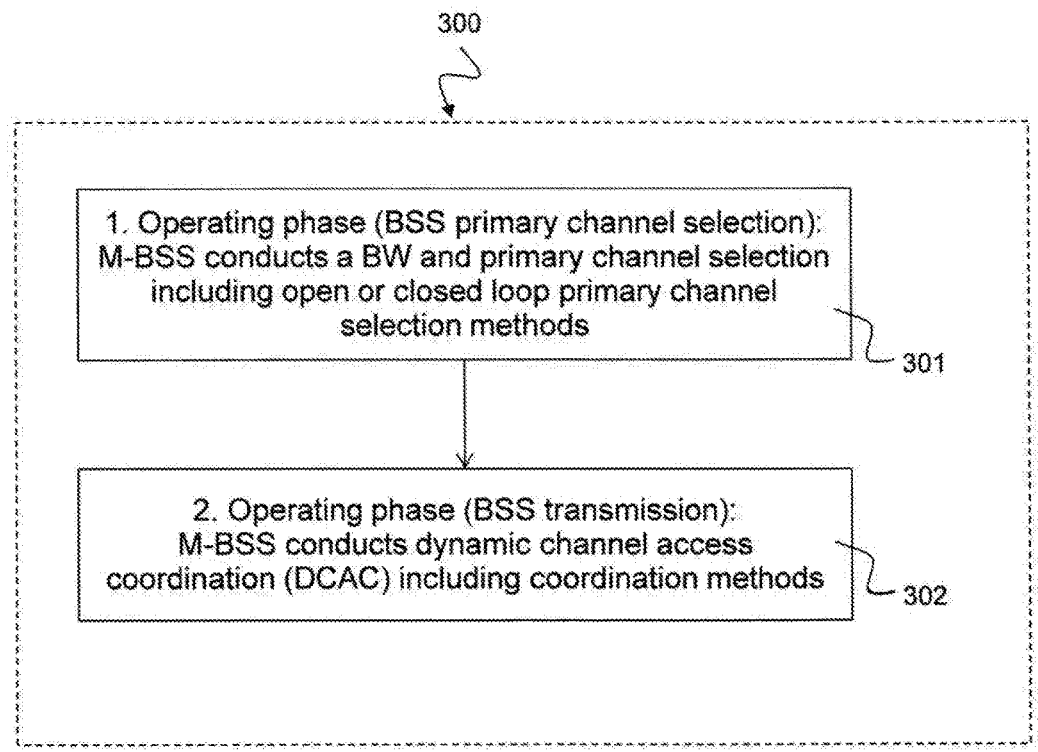
FIG. 3 is a schematic diagram illustrating a method 300 for primary channel selection and dynamic channel access coordination according to the disclosure.

FIG. 3 is a schematic diagram illustrating a method 300 for primary channel selection and dynamic channel access coordination according to the disclosure.

The method 300 represents a standards-compliant implementation method for co-located multiple IEEE 802.11 (Wi-Fi) APs or integrated in the same device (in particular Multi VAP/Multi BSSIDs systems) to synchronize their primary channel selection and dynamic bandwidth channel access and in particular solving the OBSS simultaneous operation problem. Note that the Multi-BSSIDs (M-BSS)/Multi-VAPs (M-VAP) can be allocated in the same device or in a set of distributed devices.

The method 300 is based on the following functionalities: First block 301: During the BSS primary channel selection operating phase M-BSS conduct a BW and primary channel selection including open/closed loop primary channel selection methods (e.g. signaling (only at closed loop) between M-BSS and one or more coordinators, or based on detection of previous M-BSS).

Second block 302: During the BSS transmission operating phase M-BSS conduct dynamic channel access coordination (DCAC) including coordination methods (e.g. control channel access timing, BW selection and operation parameters on the fly (dynamically) based on the other M-BSS current operating bands and activities) and/or channel condition (for example CCA).

By implementing this method (on the BSS primary channel selection and at the BSS transmission operating phases) the medium can be efficiently used.

The first block 301 can be represented in a general implementation as described in the following with respect to FIG. 4 while the second block 302 can be represented in a general implementation as described in the following with respect to FIG. 5. Both of the blocks, 301, 302 or respective methods 400, 500 can be separately implemented or can be implemented in combination.

The method 300 and also the methods 400, 500 described below provide the following advantages: Performances throughput compared to current M-BSS APs and Wi-Fi networking solutions; Cost reduction of the overall M-BSS network cost; Increase of spectrum utilization and reduction of air occupancy; Increase of network availability, decrease of latency; Reduction of protocol complexity and overheads, Reduction of the STAs delay; efficient power save; Reduction of co-location interference; and legacy IEEE 802.11 Support, i.e. there is no need to do any modification at the STAs.

The method 300 and also the methods 400, 500 described below provide a standards-compliant implementation method for co-located multiple IEEE 802.11 (Wi-Fi) APs or integrated in the same device (in particular Multi VAP/Multi BSSIDs systems) to synchronize their dynamic bandwidth channel access and in particular solving the OBSS simultaneous operation. Note that the Multi-BSSIDs (M-BSS)/Multi-VAPs (M-VAP) can be allocated in the same device or in a set of distributed devices.

The method 300 is based on the following functionalities: BW and primary channel selection 301 by M-BSS including open or closed loop operation BW and primary channel selection methods; and M-BSS dynamic channel access coordination (DCAC) 302 including coordination methods for full/partial channel overlapping scenarios.

With respect to the first functionality 301 of BW and primary channel selection by M-BSS (DCAC) functionality, the disclosure addresses two flavors of M-BSS operation BW and primary channel selection methods: open loop channel BW and primary channel selection and closed loop channel BW and primary channel selection.

Both open and closed loop methods select the operation BW and primary channel per BSSID in case the M-BSS operation BW is fully or partially overlap (partial overlapping is a subset of the full overlapping methods with less constrains). The methods also optimize the operation BW per M-BSS and try to allocate the maximal operation BW considering other restrictions (for example QoS, BSS capability and load). Note that the selection methods support two or more (up to 160 MHz/8*20 NHz bands IEEE 802.11ac limit) as function of the available 20 NHz bands.

In closed loop channel BW and primary channel selection the primary channels use a coordination signaling between M-BSS to communicate between central coordinator and/or set of distributed coordinators. At open loop channel BW and primary channel selection, a M-BSS may select the primary channel based on detection of the previous M-BSS (already selected/occupied) primary channels and operation BW.

With respect to the second functionality 302 of M-BSS dynamic channel access coordination (DCAC) functionality the method 300 supports two or more M-BSS try access (gain the air and transmit and/or receive information) simultaneously, synchronized/un synchronized (in terms of RX and TX periods) to specific partial or full overlapping frequency bands (assuming that BW and primary channel selection by M-BSS coordination already done manually or using previous section 301 of the method 300).

The disclosed M-BSS Dynamic Channel Access Coordination (DCAC) implementation methodology 302 coordinates a simultaneous orthogonal channel access, operating bands allocation of overlapping co-located M-BSS. DCAC provides a specific M-BSS with a mechanism to control channel access timing and parameters on the fly (dynamically) based on the other M-BSS current operating bands.

Based on the disclosed methodology 302, if one of the M-BSSs expects an access to the air (the procedure of "Win the access" is based on IEEE 802.11 channel access standard procedure) it can coordinate the operation band for the next transmission/transmissions/transmission opportunities (TX-OPs) with other M-BSSs. Note that there is not only transmission, it can also include an exchange of frames. A central coordinator/distributed coordinator/s (using a dedicated signaling) will get the entire request for channel access per coordinated M-BSSs and will return for each request what is the allocated BW for the next transmission/s, TXOP/s (note that the M-BSSs can start and end at a different time slot/start TX time).

By coordinating the M-BSS DCAC operations, the implementation methodology 302 enables to embed QoS by privileged channel access to individual M-BSS at a particular time (For example, by assigning full access parameters to M-BSS or assigning more BW to a privileged to M-BSS s). By controlling how much each M-BSS may be given the privileged channel access, a proportional partitioning of channel capacity among M-BSSs can also be achieved.

Embodiments of the implementation method 300 may include: M-BSS primary channel and operating BW selection based on other M-BSS primary channel available/able to share BW/operating BW; Algorithm and infrastructure that allows to coordinate and synchronize the next transmission opportunity between multiple M-BSS; multiple M-BSS common transmission opportunity format coordination and selection; Coordination of the M-BSS capabilities parameters (service sets (BSS)), etc.

In order to preserve the 802.11 compatibility the coordinate and synchronized BW sharing with other M-BSS need to preserve the basic channel access rules, which includes that the air interface is available and frames can be transmitted if the medium is idle and the other M-BSS already used it. As part of M-BSS coordination and synchronization all M-BSS need to preserve the following guidelines: Notify to the M-BSS Central Channel access Scheduler when their next transmission opportunity is expected to occur (assuming that their primary channel will be free/no CCA until then); Optionally notify to the Central Channel access Scheduler what their requirements from their next transmission opportunity (BW, duration, etc.); Follow the M-BSS Central Channel access Scheduler BW allocation.

Figure 4:
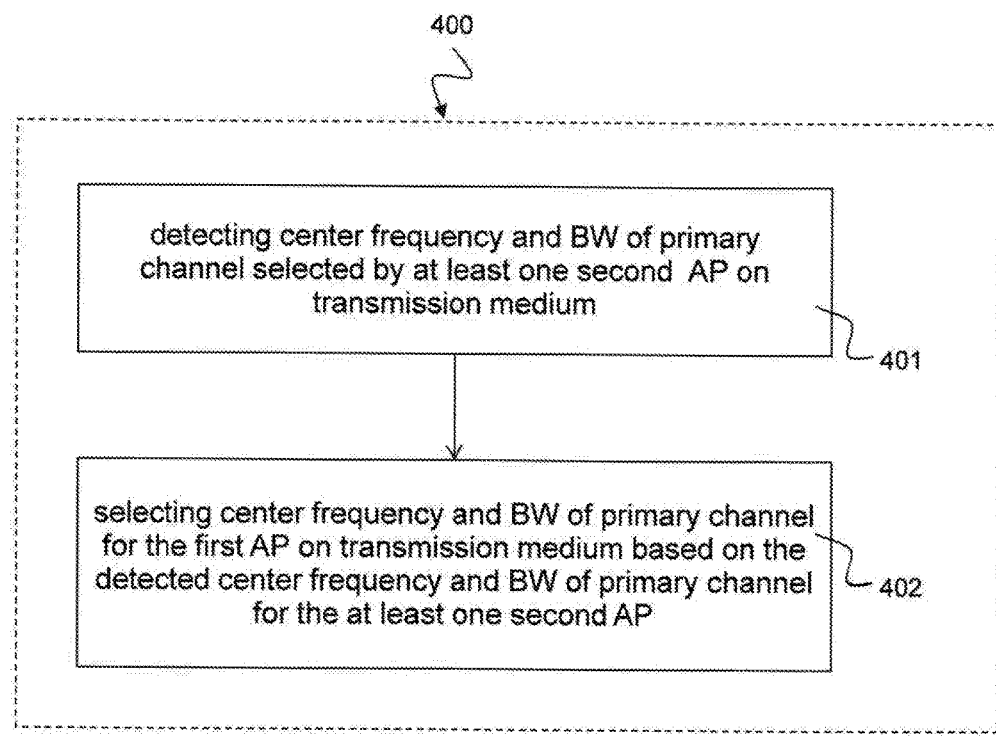
FIG. 4 is a schematic diagram illustrating a method 400 for primary channel selection according to the disclosure.

FIG. 4 is a schematic diagram illustrating a method 400 for primary channel selection according to the disclosure. The method 400 for primary channel selection by a first access point type communication device (AP) of a group of APs includes the following: detecting 401, by the first AP, a central frequency and a bandwidth of a primary channel selected by at least one second AP of the group of APs on a transmission medium; selecting 402, by the first AP, a central frequency location and a bandwidth of a primary channel for the first AP on the transmission medium, wherein the selection of the central frequency and bandwidth of the primary channel for the first AP is based on the detected central frequency location and bandwidth of the primary channel for the at least one second AP. Note that transmission medium" or "transmission resource" is also characterized the full transmission/operation mode during the transmission/s and/or TXOP/s period.

The group of APs may include multiple virtual APs (multi VAPs) or multiple basic service sets (multi BSSs) according to the IEEE 802.11 WiFi standard. The multi VAPs and/or the multi BSSs may be allocated to a same device or allocated to a set of distributed devices.

The method 400 may further include: selecting the central frequency location and bandwidth of the primary channel for the first AP from a section of the transmission medium not occupied by the primary channel of the at least one second AP.

The method 400 may further include: selecting the central frequency location and bandwidth of the primary channel for the first AP based on a frequency minimal distance relation, e.g. a minimal frequency backoff from the central frequency location, with respect to a section of the transmission medium occupied by the primary channel of the at least one second AP.

The method 400 may further include: selecting the central frequency location and bandwidth of the primary channel for the first AP based on an at least partial overlap with the primary channel of the at least one second AP.

The method 400 may further include: selecting the central frequency location and bandwidth of the primary channel for the first AP based on closed loop bandwidth and primary channel selection.

The method 400 may further include: selecting the central frequency location and bandwidth of the primary channel for the first AP based on coordination signaling between the first AP and the at least one second AP.

The method 400 may further include: selecting the central frequency location and bandwidth of the primary channel for the first AP based on coordination signaling between the first AP, the at least one second AP and a central coordinator.

The method 400 may further include: selecting the central frequency location and bandwidth of the primary channel for the first AP based on open loop bandwidth and primary channel selection.

The method 400 may further include: selecting the central frequency location and bandwidth of the primary channel for the first AP based on detection of previously selected primary channels and bandwidths.

Figure 5:
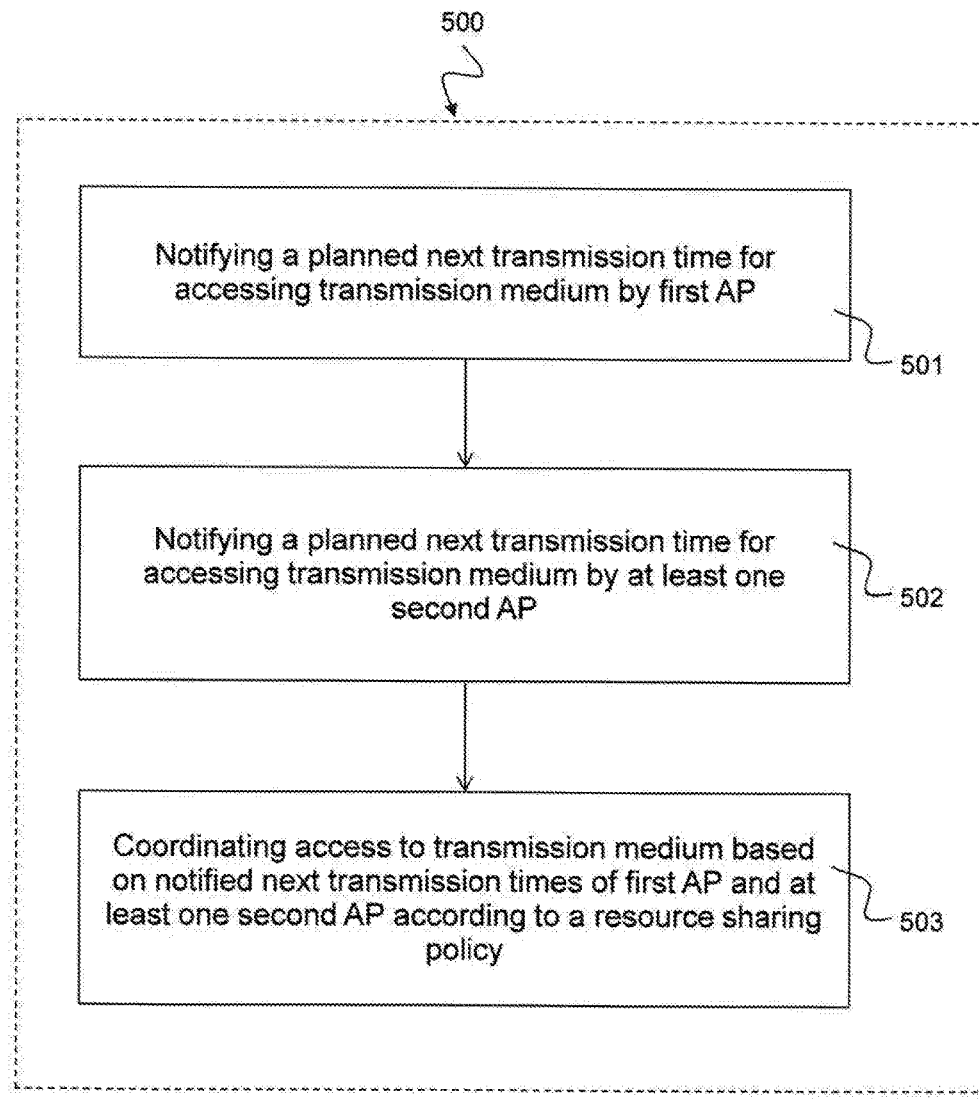
FIG. 5 is a schematic diagram illustrating a method 500 for access coordination according to the disclosure.

FIG. 5 is a schematic diagram illustrating a method 500 for access coordination according to the disclosure. The method 500 for coordinating access to a transmission medium for a group of associated access point type communication devices (APs) includes the following: notifying 501 a planned next transmission time for accessing the transmission medium by a first AP of the group of APs; notifying 502 a planned next transmission time for accessing the transmission medium by at least one second AP of the group of APs; and coordinating 503 access to the transmission medium based on the notified next transmission opportunity times of the first AP and the at least one second AP according to a resource sharing policy.

The group of APs may include multiple virtual APs (multi VAPs) or multiple basic service sets (multi BSSs) according to the IEEE 802.11 WiFi standard. The multi VAPs and/or the multi BSSs may be allocated to a same device or allocated to a set of distributed devices.

The planned next transmission opportunity time of the first AP and the at least one second AP, respectively, may include a transmission opportunity, e.g. a planned start time and a planned end time or a planned time duration for a next transmission.

The method 500 may further include: notifying transmission opportunity requirements for accessing the transmission medium by the first AP; notifying transmission opportunity requirements for accessing the transmission medium by the at least one second AP; and coordinating the access to the transmission medium based on the notified transmission opportunity requirements of the first AP and the at least one second AP.

The transmission opportunity requirements may include a bandwidth and a duration of a next transmission opportunity of the first AP and the at least one second AP, respectively.

The method 500 may further include: scheduling an allocation of at least part of the transmission medium for the first AP and the at least one second AP according to the resource sharing policy.

The resource sharing policy may be based on one of the following: symmetric partial bandwidth sharing, full bandwidth sharing or asymmetric partial bandwidth sharing.

Figure 6A:
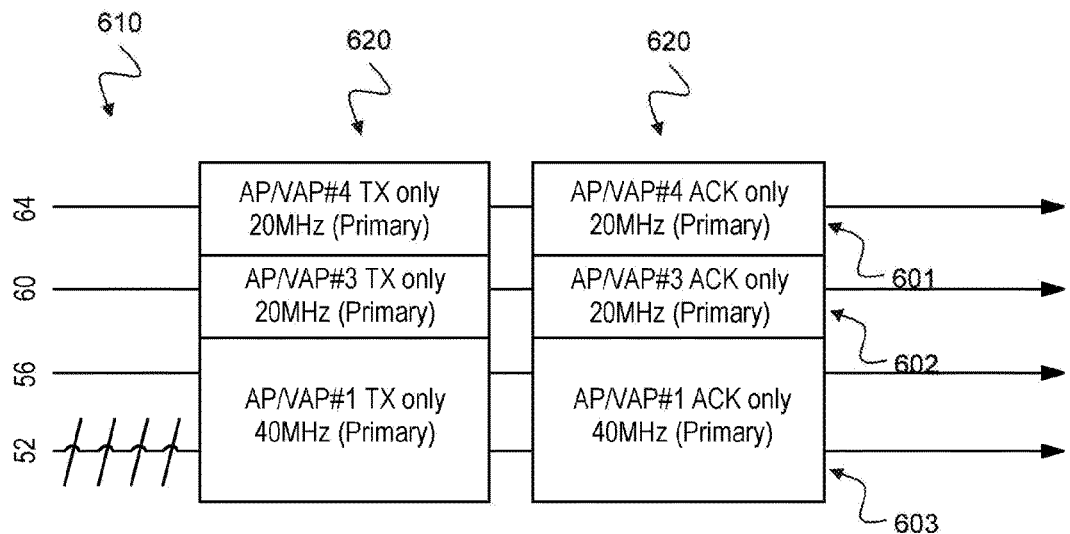
FIG. 6a is a schematic diagram illustrating M-BSS coordination with TX and RX timing synchronization according to the disclosure.

FIG. 6a is a schematic diagram illustrating M-BSS coordination with TX and RX timing synchronization according to the disclosure. The timing synchronization is performed between three M-BSS 601, 602, 603. The coordination is based on a channel access phase 610 and a transmission operating phase 620. In a first part of the transmission operating phase 620 an exemplary 20 MHz primary channel is used for AP/VAP#4 601 in TX only mode, an exemplary 20 MHz primary channel is used for AP/VAP#3 602 in TX only mode and an exemplary 40 MHz primary channel is used for AP/VAP#1 603 in TX only mode. In a second part of the transmission operating phase 620 the respective primary channels are used in ACK only mode.

The method enables a set of Multi VAP/Multi BSSIDs to use different orthogonal sets of primary channels and between them dynamically coordinate the usage of their secondary channels. The proposed coordination method can be implicit (air occupancy detection) or explicit (over the air/via cloud coordination).

Figure 6B:
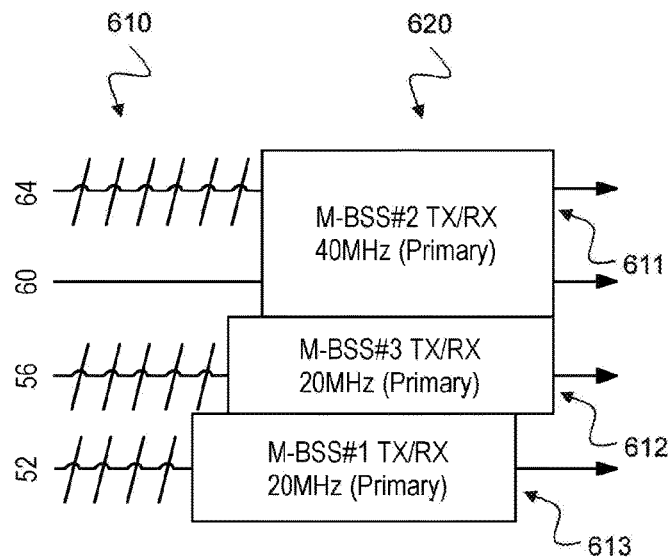
FIG. 6b is a schematic diagram illustrating M-BSS coordination without TX and RX timing synchronization according to the disclosure.

FIG. 6b is a schematic diagram illustrating M-BSS coordination without TX and RX timing synchronization according to the disclosure.

An exemplary 40 MHz primary channel is used for M-BSS#2 601 in TX/RX mode, an exemplary 20 MHz primary channel is used for M-BSS#3 602 in TX/RX mode and an exemplary 20 MHz primary channel is used for M-BSS#1 603 in TX/RX mode.

Figure 7:
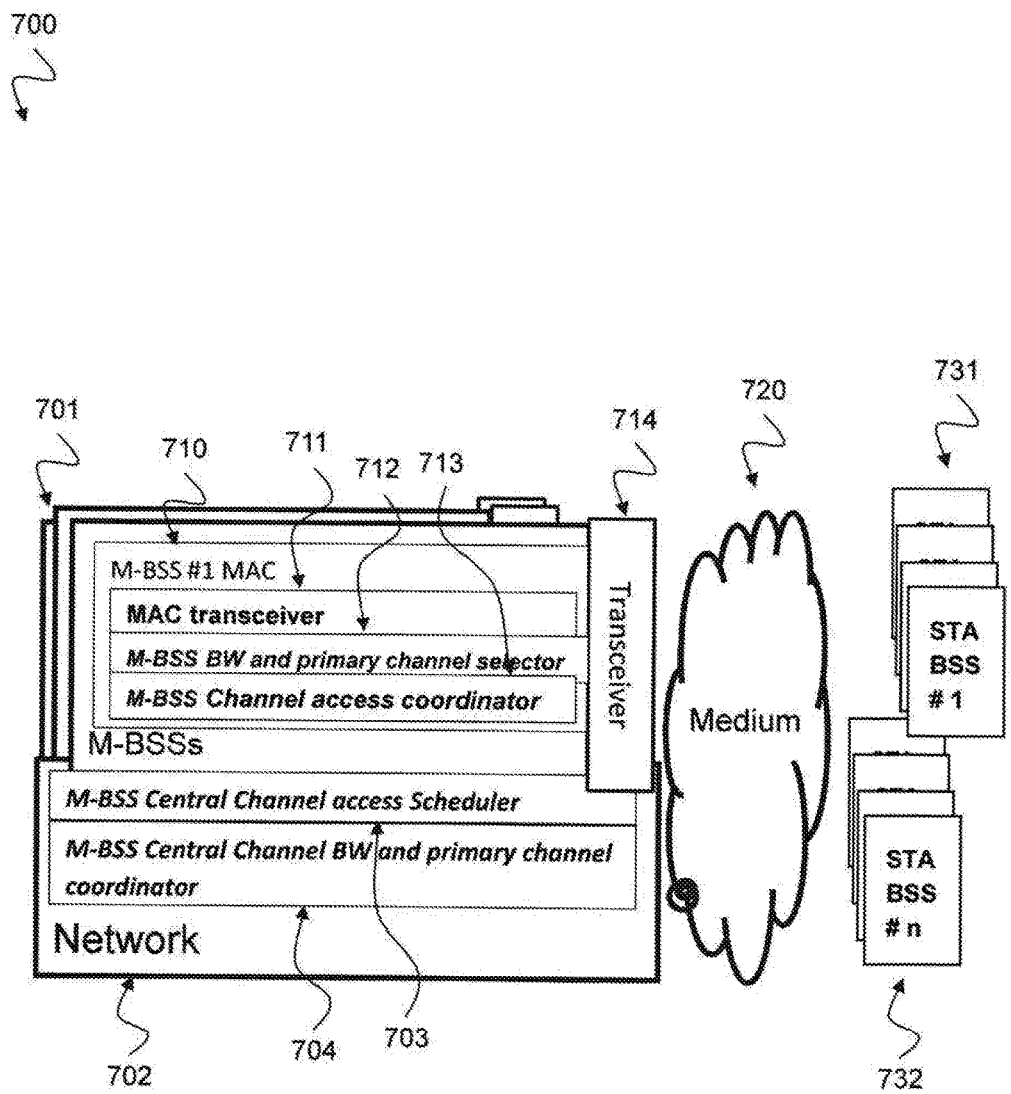
FIG. 7 is a system diagram illustrating an exemplary co-located M-BSS according to the disclosure.

FIG. 7 is a system diagram illustrating an exemplary co-located M-BSS according to the disclosure.

The system includes a plurality of co-located M-BSS 701 and a network 702. Each M-BSS 701 includes a MAC device, e.g. M-BSS#1 MAC 710 including a MAC transceiver 711, M-BSS BW and primary channel selector 712 and M-BSS channel access coordinator unit 713. Each M-BSS 701 includes a transceiver 714 for transceiving over a medium 720, e.g. over the air, to groups of stations STA BSS#1 731, STA BSS#n 732. In the network 702 a M-BSS central channel access scheduler 703 and a M-BSS central channel BW and primary channel coordinator 704 are located. The modules 712, 713 may perform the method 400 or the first functionality 301 of method 300 as described above. The modules 703, 704 may perform the method 500 or the second functionality 302 of method 300 as described above.

The PHY and MAC transceivers 710, 714 are common 802.11 transceiver functionalities. M-BSSs Channel BW and primary channel selector 712 is responsible to generate the co-located medium primary channel operation and channel BW and sharing signaling that may include: M-BSSs capabilities; M-BSSs recommended primary channel operation and channel BW; other Medium sharing initiation signaling. M-BSSs Channel access coordinator 713 is responsible to generate the co-located medium sharing signaling that may include: Expected Transmit opportunity parameter timing (start, end, etc.); Expected transmit opportunity parameter format (BW per AP, transmission opportunity duration, protection, power (in VAP), multi antenna operation, ACK policy, etc.). M-BSSs Central Channel BW and primary channel coordinator 704 is the end point that coordinates primary channel operation Channel BW between the M-BSSs. M-BSSs Central Channel access Scheduler 703 is the end point that coordinates next transmission opportunity timing, BW (and others next transmission opportunity parameters) between the M-BSSs.

Figure 8:
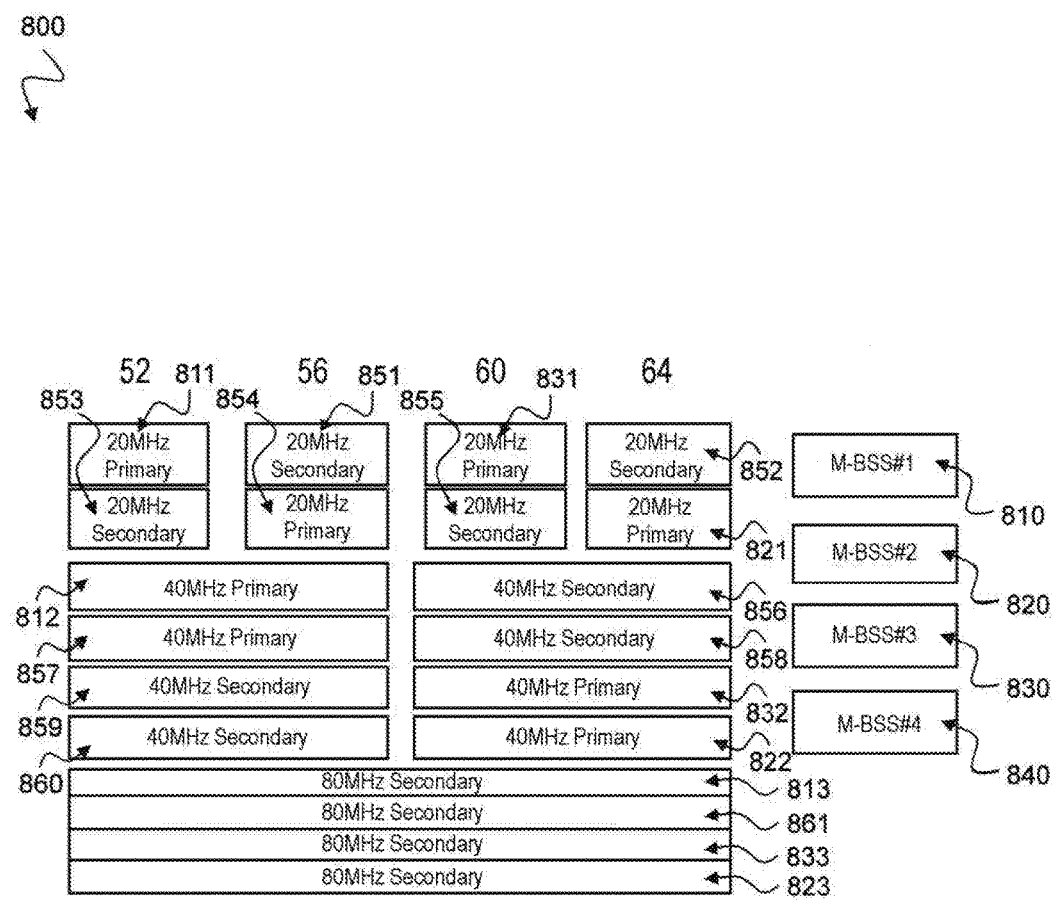
FIG. 8 is a schematic diagram illustrating an illustrative example 800 for channel bandwidth and primary channel selection of M-BSS for an exemplary number of four overlapping 80 MHz channels.

FIG. 8 is a schematic diagram illustrating an illustrative example 800 for channel bandwidth and primary channel selection of M-BSS for an exemplary number of four overlapping 80 MHz channels.

The example of FIG. 8 illustrates a channel BW and primary channel selection of M-BSS (4 full overlapping 80 MHz operation BW—channels 52, 56, 60 and 64): The first M-BSS #1 810 will select (arbitrary) channel 52 as his primary channel 811. Then M-BSS #2 820 will detect that channel 52 is already occupied by M-BSS #1 810 and it will select channel 64 as his primary channel 821 (farthest channel). Then M-BSS #3 830 will detect that channels 52 and 64 are already occupied by M-BSS #1 810 and #2 820 and it will select channel 60 (or 56) as his primary channel 831 (farthest channel). Then M-BSS #4 840 will detect that channels 52, 60 and 64 are already occupied by M-BSS #1#2 and #3 810, 820, 830 and it will select channel 56 as his primary channel 854 (farthest channel). Then M-BSS #5 will detect that channels 52, 56, 60 and 64 are already occupied by M-BSS #1, #2, #3 and #4 810, 820, 830, 840 and it will select channel 52 as his primary channel (farthest channel). Other channels may be selected as secondary channels or as further primary channels of different bandwidth.

Figure 9:
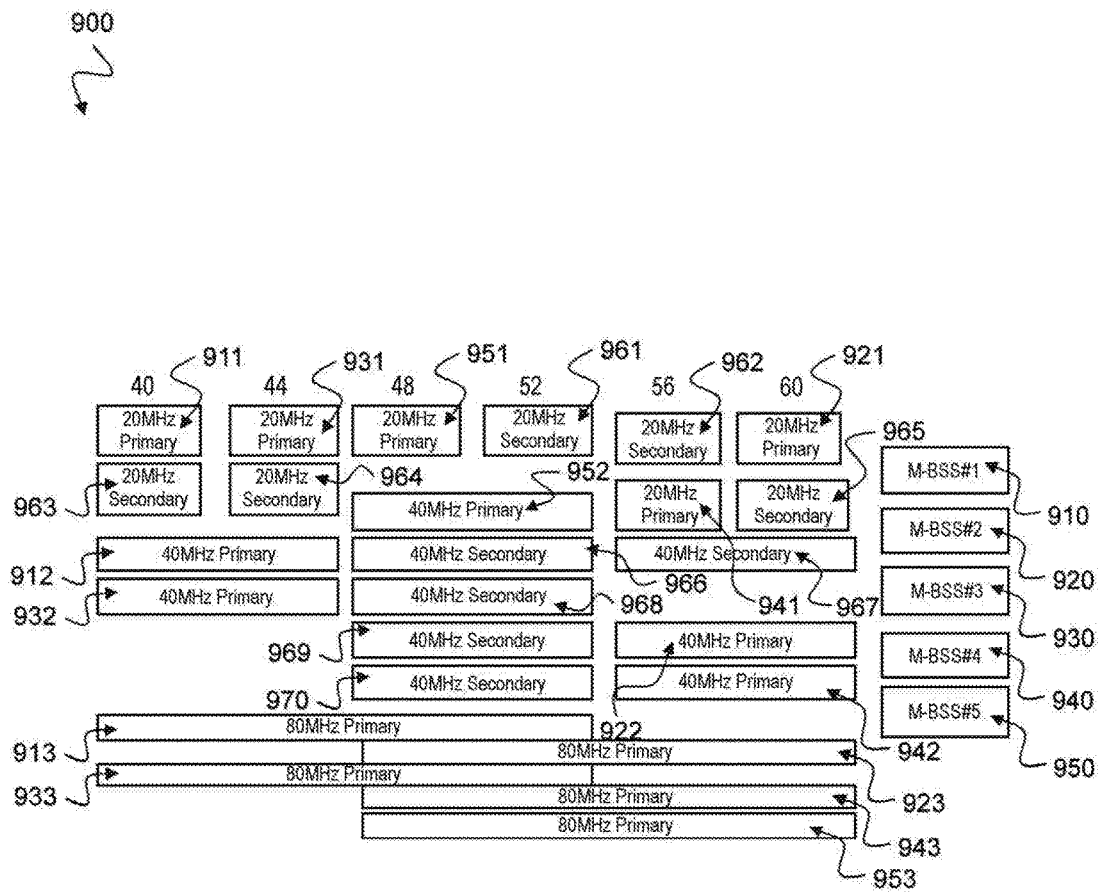
FIG. 9 is a schematic diagram illustrating an illustrative example 900 for M-BSS dynamic channel access coordination.

FIG. 9 is a schematic diagram illustrating an illustrative example 900 for M-BSS dynamic channel access coordination.

The example of FIG. 9 illustrates a channel BW and primary channel selection of M-BSSs (4 partial overlapping 80 MHz operation BW—channels 40, 44, 48, 52, 56 and 60): The first M-BSS #1 910 (operation BW=40, 44, 48, 52) will select (arbitrary) channel 40 as his primary channel 911. Then M-BSS #2 920 (operation BW=48, 52, 56 and 60) will detect that channel 40 is already occupied by M-BSS #1 910 and it will select channel 60 as his primary channel 921 (farthest channel). Then M-BSS #3 930 (operation BW=40, 44, 48, 52) will detect that channels 40 and 60 are already occupied by M-BSS #1 910 and #2 920 and it will select channel 44 as his primary channel 931 (farthest channel). Then M-BSS #4 940 (operation BW=48, 52, 56 and 60) will detect that channels 40,44 and 60 are already occupied by M-BSS #1#2 and #3 910, 920, 930 and it will select channel 56 as his primary channel 941 (farthest channel). Then M-BSS #5 950 (operation BW=48, 52, 56 and 60) will detect that channels 40,44,56 and 60 are already occupied by M-BSS #1, #2, #3 and #4 910, 920, 930, 940 and it will select channel 48 as his primary channel 951 (farthest channel). Other channels may be selected as secondary channels or as further primary channels of different bandwidth.

Figure 10A:
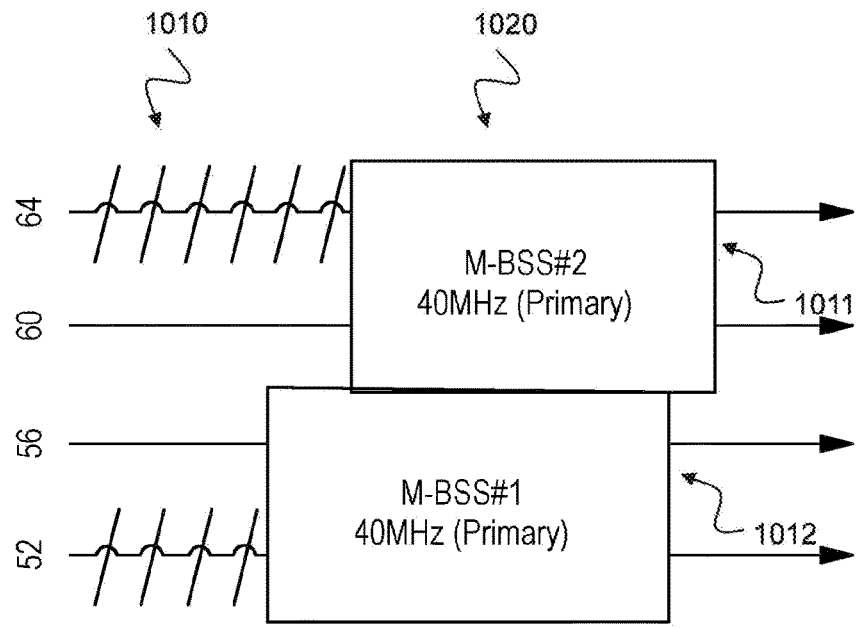
FIG. 10a is a schematic diagram illustrating an exemplary symmetric partial bandwidth sharing policy according to the disclosure.

FIG. 10a is a schematic diagram illustrating an exemplary symmetric partial bandwidth sharing policy according to the disclosure. For both of M-BSS #1 1012 and M-BSS #2 1011, the same amount of bandwidth will be reserved. In a channel access phase 1010, BW and primary channel selection according to method 301 or 400 may be performed. In a transmission operation phase 1020 dynamic channel access coordination according to method 302 or 500 may be performed.

Figure 10B:
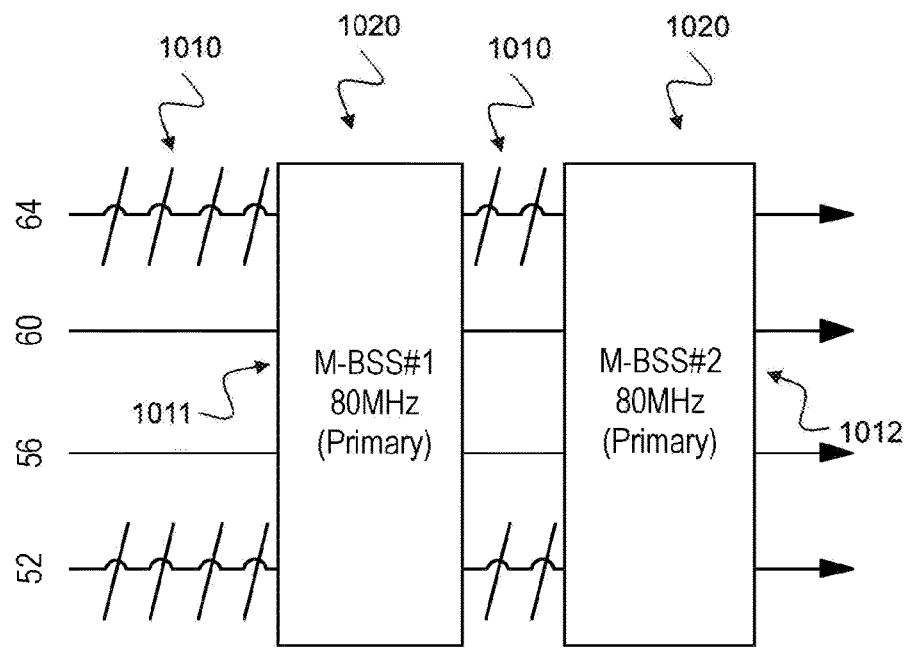
FIG. 10b is a schematic diagram illustrating an exemplary full bandwidth sharing policy according to the disclosure.

FIG. 10b is a schematic diagram illustrating an exemplary full bandwidth sharing policy according to the disclosure.

For both of M-BSS #1 1012 and M-BSS #2 1011, the same bandwidth will be used in a time-shared manner. In two respective channel access phases 1010, BW and primary channel selection according to method 301 or 400 may be performed. In two respective time-shared transmission operation phases 1020 dynamic channel access coordination according to method 302 or 500 may be performed.

Figure 11:
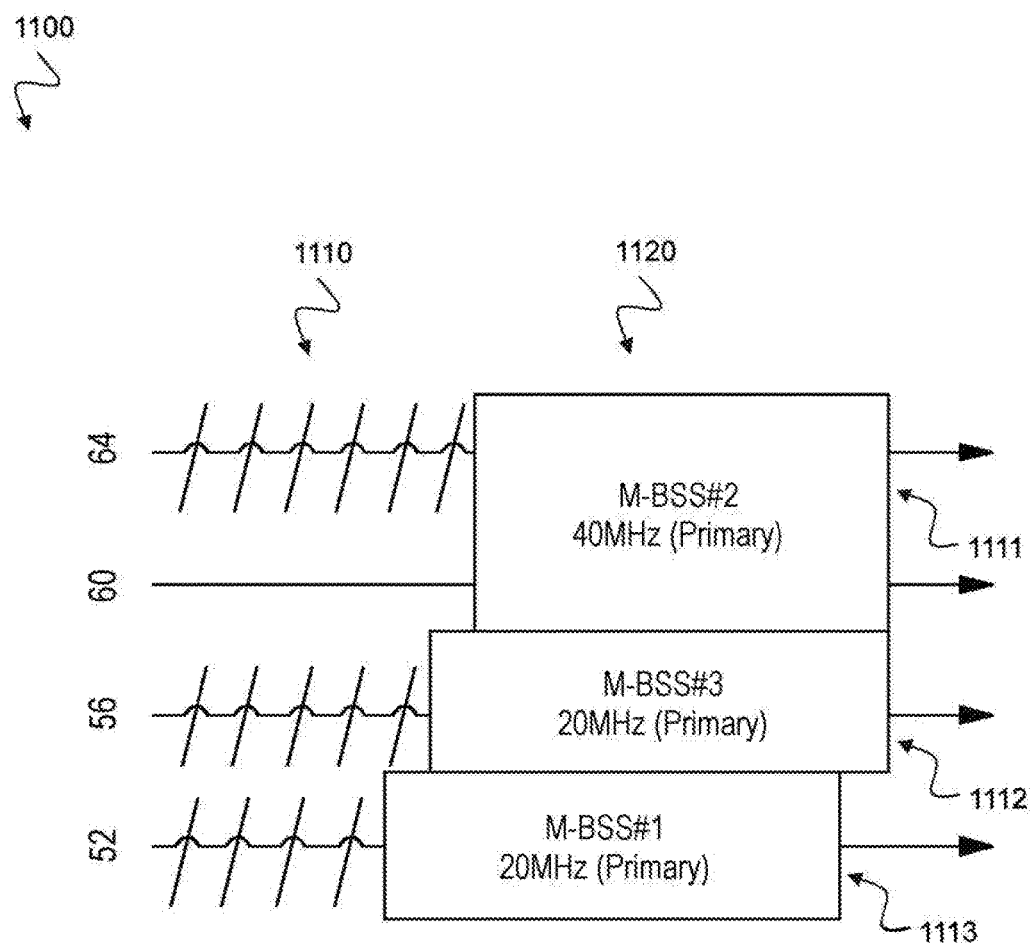
FIG. 11 is a schematic diagram illustrating an exemplary asymmetric partial bandwidth sharing policy 1100 according to the disclosure.

FIG. 11 is a schematic diagram illustrating an exemplary asymmetric partial bandwidth sharing policy 1100 according to the disclosure.

For two M-BSS #1 1113 and M-BSS #3 1112, the same amount of bandwidth will be reserved while for a third M-BSS #2 1111, twice of the amount of bandwidth will be reserved. In a channel access phase 1110, BW and primary channel selection according to method 301 or 400 may be performed. In a transmission operation phase 1120 dynamic channel access coordination according to method 302 or 500 may be performed.

M-BSS will be able to coordinate the transmission opportunity time and transmission opportunity BW (without TX and RX timing synchronization). Throughput is increased due to reduction of overheads and reduction of co-location interference.

Note that for all examples above there was no coordination, only three M-BSS #1 will transmit (no BW sharing), i.e. full BW sharing policy first come first served policy.

Figure 12:
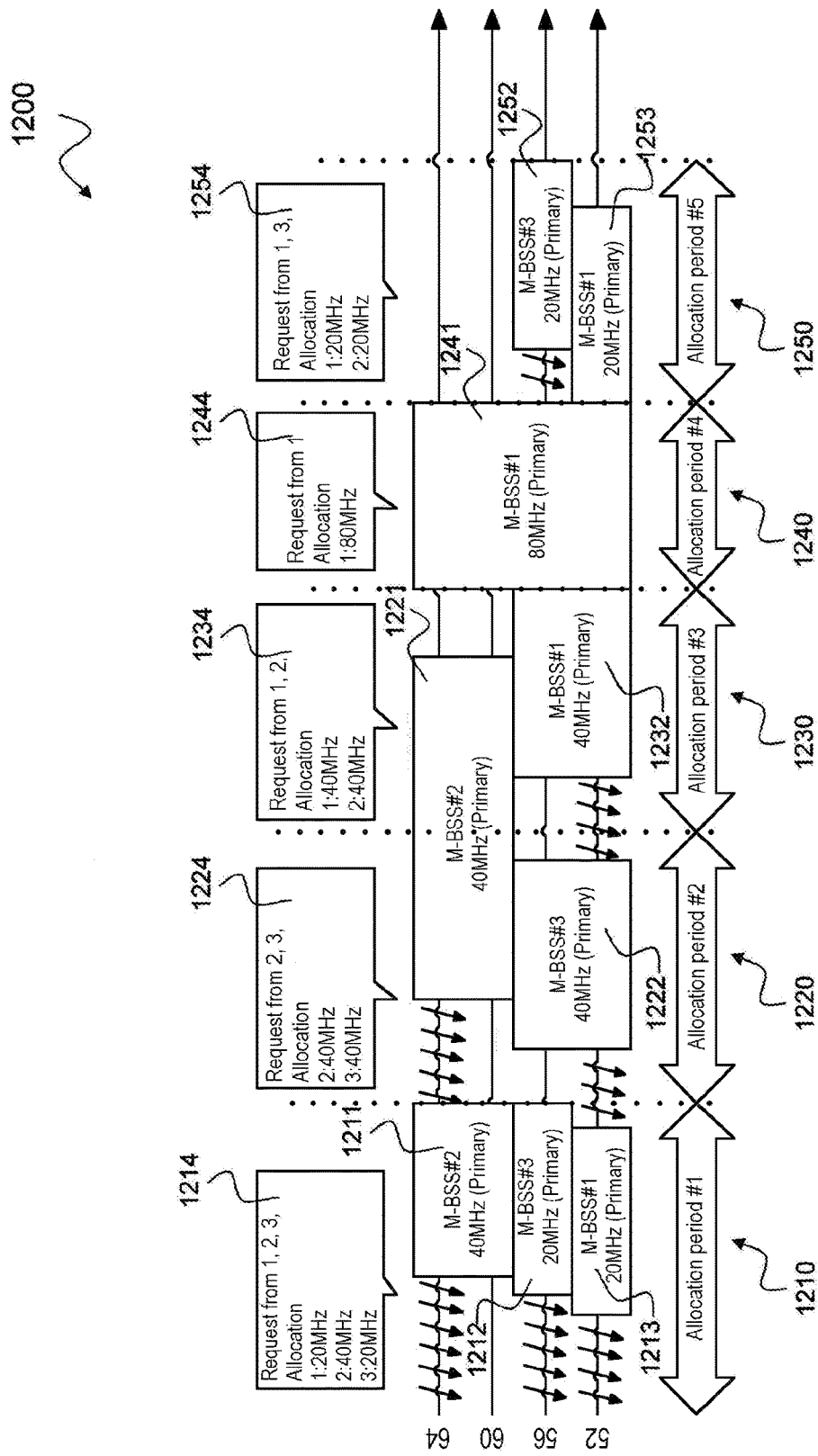
FIG. 12 is a schematic diagram illustrating an M-BSS central channel access scheduler bandwidth allocation method 1200 according to the disclosure.

FIG. 12 is a schematic diagram illustrating an M-BSS central channel access scheduler bandwidth allocation method 1200 according to the disclosure.

In a first allocation period 1210, request 1214 from M-BSS#1, M-BSS#2 and M-BSS#3 for 20 MHz, 40 MHz and 20 MHz primary channel is processed. Channel access for 40 MHz primary channel is provided to M-BSS#2 1211; channel access for 20 MHz primary channel is provided to M-BSS#3 1212; and channel access for 20 MHz primary channel is provided to M-BSS#1 1213.

In a second allocation period 1220, request 1224 from M-BSS#2 and M-BSS#3 for 40 MHz, 40 MHz primary channel is processed. Channel access for 40 MHz primary channel is provided to M-BSS#2 1221; channel access for 40 MHz primary channel is provided to M-BSS#3 1222.

In a third allocation period 1230, request 1234 from M-BSS#1 and M-BSS#2 for 40 MHz, 40 MHz primary channel is processed. Channel access for 40 MHz primary channel is provided to M-BSS#1 1232; channel access for 40 MHz primary channel is provided to M-BSS#2 1221.

In a fourth allocation period 1240, request 1244 from M-BSS#1 for 80 MHz primary channel is processed. Channel access for 80 MHz primary channel is provided to M-BSS#1 1241.

In a fifth allocation period 1250, request 1254 from M-BSS#1 and M-BSS#3 for 20 MHz, 20 MHz primary channel is processed. Channel access for 20 MHz primary channel is provided to M-BSS#1 1253; channel access for 20 MHz primary channel is provided to M-BSS#3 1252.

Figure 13:
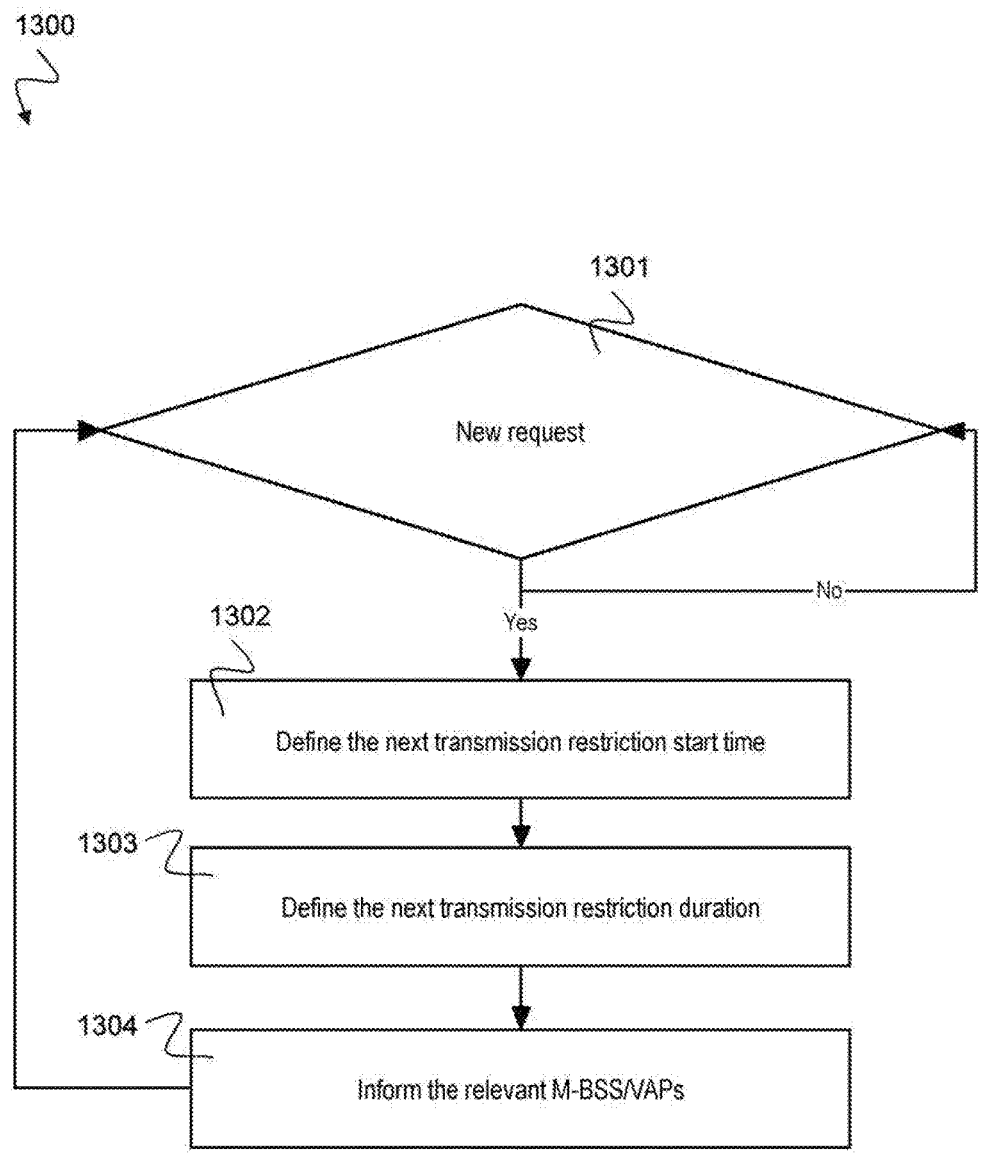
FIG. 13 is a sequence diagram illustrating an exemplary implementation 1300 of the M-BSS central channel access scheduler bandwidth allocation method 1200 according to the disclosure.

FIG. 13 is a sequence diagram illustrating an exemplary implementation 1300 of the M-BSS central channel access scheduler bandwidth allocation method 1200 according to the disclosure.

If a new request 1301 arrives, a second block 1302 is performed in which the next transmission opportunity restriction start time is defined. Then in a third block 1303 the next transmission opportunity restriction duration is defined and in a fourth block 1304 the relevant M-BSS/VAPs are informed. Then checking upon a next request 1301 is repeated.

Figure 14:
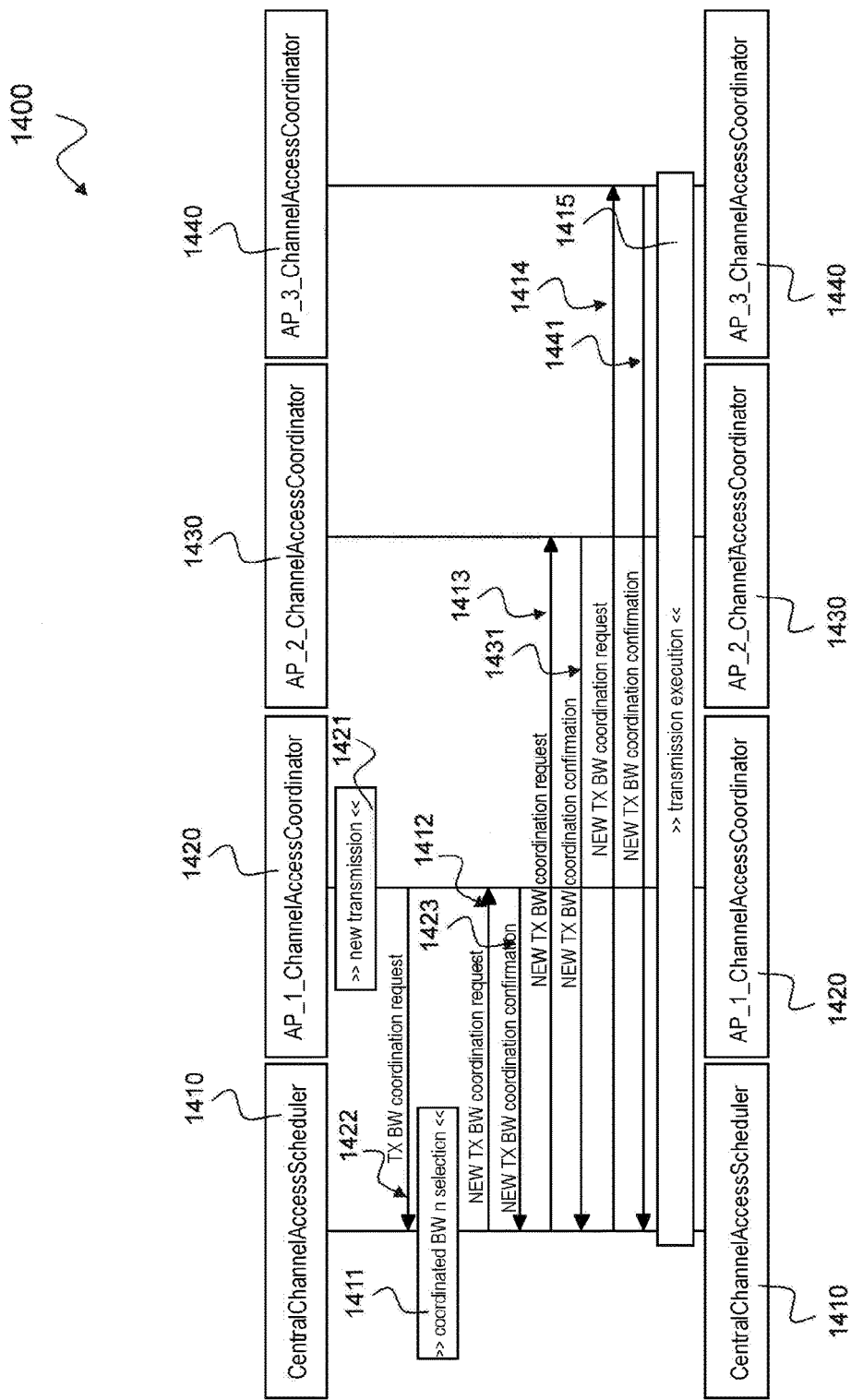
FIG. 14 is a message flow diagram illustrating an exemplary implementation 1400 of the M-BSS central channel access scheduler bandwidth allocation method 1200 according to the disclosure.

FIG. 14 is a message flow diagram illustrating an exemplary implementation 1400 of the M-BSS central channel access scheduler bandwidth allocation method 1200 according to the disclosure.

Upon a new transmission opportunity request 1421 the AP#1 channel access coordinator 1420 transmits a TY BW coordination request 1422 to the central channel access scheduler 1410 which coordinates BW selection 1411 and transmits a new TX BW coordination request 1412 to the AP#1 channel access coordinator 1420 which confirms new TX BW coordination 1423.

Then, the central channel access scheduler 1410 transmits a new TX BW coordination request 1413 to the AP#2 channel access coordinator 1430 which confirms new TX BW coordination 1431.

Then, the central channel access scheduler 1410 transmits a new TX BW coordination request 1414 to the AP#3 channel access coordinator 1440 which confirms new TX BW coordination 1441. Then transmission opportunity can be executed 1415.

Figure 15:
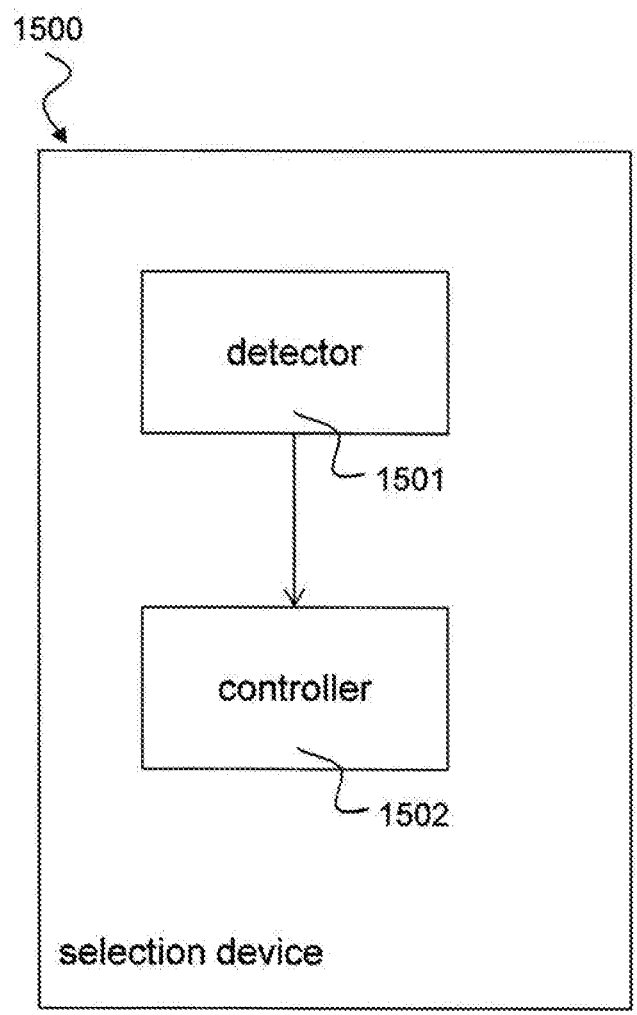
FIG. 15 is a block diagram illustrating a selection device 1500 for primary channel selection according to the disclosure.

FIG. 15 is a block diagram illustrating a selection device 1500 for primary channel selection according to the disclosure. The selection device 1500 for primary channel selection by a first access point type communication device (AP) of a group of APs may perform the method 400 as described above with respect to FIG. 4.

The selection device 1500 includes a detector 1501 and a controller 1502. The detector 1501 is configured to detect a central frequency location and a bandwidth of a primary channel selected by at least one second AP of the group of APs on a transmission medium. The controller 1502 is configured to select a central frequency location and a bandwidth of a primary channel for the first AP on the transmission medium. The controller 1502 is configured to select the central frequency location and bandwidth of the primary channel for the first AP based on the detected central frequency location and bandwidth of the primary channel for the at least one second AP, e.g. as described above with respect to FIGS. 6 to 14.

Figure 16:
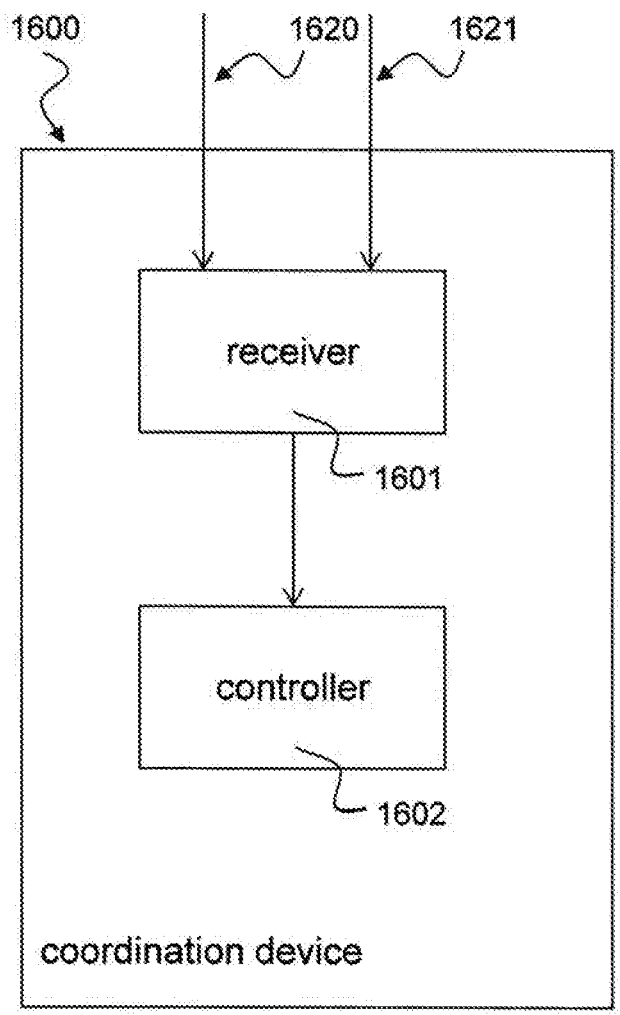
FIG. 16 is a block diagram illustrating a coordination device 1600 for access coordination according to the disclosure.

FIG. 16 is a block diagram illustrating a coordination device 1600 for access coordination according to the disclosure. The coordination device 1600 for coordinating access to a transmission medium for a group of access point type communication devices (APs) may perform the method 500 as described above with respect to FIG. 5.

The coordination device 1600 includes a receiver 1601 and a controller 1602. The receiver 1601 is configured to receive a notification 1620 of a planned next transmission opportunity time for accessing the transmission medium by a first AP of the group of APs. The receiver 1601 is further configured to receive a notification 1621 of a planned next transmission opportunity time for accessing the transmission medium by a second AP of the group of APs, e.g. as described above with respect to FIGS. 6 to 14.

The controller 1602 is configured to coordinate access to the transmission medium based on the received notifications 1620, 1621 for the next transmission opportunity times of the first AP and the second AP according to a resource sharing policy, e.g. as described above with respect to FIGS. 6 to 14.

The devices and systems described in this disclosure may be implemented as Digital Signal Processors (DSP), microcontrollers or any other side-processor or hardware circuit on a chip or an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods described above and the computing blocks described above. Such a computer program product may include a readable storage medium storing program code thereon for use by a processor, the program code comprising instructions for performing the method or the computing blocks as described above.

EXAMPLES

The following examples pertain to further embodiments. Example 1 is a method for primary channel selection by a first access point type communication device (AP) of a group of APs, the method comprising: detecting, by the first AP, a central frequency location and a bandwidth of a primary channel selected by at least one second AP of the group of APs; selecting, by the first AP, a central frequency location and a bandwidth of a primary channel for the first AP, wherein the selection of the central frequency location and bandwidth of the primary channel for the first AP is based on the detected central frequency location and bandwidth of the primary channel for the at least one second AP.

In Example 2, the subject matter of Example 1 can optionally include that the group of APs comprises multiple virtual APs (multi VAPs) or multiple basic service sets (multi BSSs) according to the IEEE 802.11 WiFi standard.

In Example 3, the subject matter of Example 2 can optionally include that the multi VAPs and/or the multi BSSs are allocated to a same device or allocated to a set of distributed devices.

In Example 4, the subject matter of any one of Examples 1-3 can optionally include: selecting the central frequency location and bandwidth of the primary channel for the first AP from a section of a transmission medium not occupied by the primary channel of the at least one second AP.

In Example 5, the subject matter of any one of Examples 1-4 can optionally include: selecting the central frequency location and bandwidth of the primary channel for the first AP based on a frequency distance relation, e.g. a minimal frequency backoff, with respect to a section of a transmission medium occupied by the primary channel of the at least one second AP.

In Example 6, the subject matter of any one of Examples 1-5 can optionally include: selecting the central frequency location and bandwidth of the primary channel for the first AP based on an at least partial overlap with the primary channel of the at least one second AP.

In Example 7, the subject matter of any one of Examples 1-6 can optionally include: selecting the central frequency location and bandwidth of the primary channel for the first AP based on closed loop bandwidth and primary channel selection.

In Example 8, the subject matter of Example 7 can optionally include: selecting the central frequency location and bandwidth of the primary channel for the first AP based on coordination signaling between the first AP and the at least one second AP.

In Example 9, the subject matter of any one of Examples 7-8 can optionally include: selecting the central frequency location and bandwidth of the primary channel for the first AP based on coordination signaling between the first AP, the at least one second AP and a central coordinator.

In Example 10, the subject matter of any one of Examples 1-9 can optionally include: selecting the central frequency location and bandwidth of the primary channel for the first AP based on open loop bandwidth and primary channel selection.

In Example 11, the subject matter of Example 10 can optionally include: selecting the central frequency location and bandwidth of the primary channel for the first AP based on detection of previously selected primary channels and bandwidths.

Example 12 is a method for coordinating access to a transmission medium for a group of associated access point type communication devices (APs), the method comprising: notifying a planned next transmission opportunity time for accessing the transmission medium by a first AP of the group of APs; notifying a planned next transmission opportunity time for accessing the transmission medium by at least one second AP of the group of APs; and coordinating access to the transmission medium based on the notified next transmission opportunity times of the first AP and the at least one second AP according to a resource sharing policy.

In Example 13, the subject matter of Example 12 can optionally include that the group of APs comprises multiple virtual APs (multi VAPs) or multiple basic service sets (multi BSSs) according to the IEEE 802.11 WiFi standard.

In Example 14, the subject matter of Example 13 can optionally include that the multi VAPs and/or the multi BSSs are allocated to a same device or allocated to a set of distributed devices.

In Example 15, the subject matter of any one of Examples 12-14 can optionally include that the planned next transmission opportunity time of the first AP and the at least one second AP, respectively, comprises a transmission opportunity (TXOP), e.g. a planned start time and a planned end time for a next transmission.

In Example 16, the subject matter of any one of Examples 12-15 can optionally include: notifying transmission opportunity requirements for accessing the transmission medium by the first AP; notifying transmission opportunity requirements for accessing the transmission medium by the at least one second AP; and coordinating the access to the transmission medium based on the notified transmission opportunity requirements of the first AP and the at least one second AP.

In Example 17, the subject matter of Example 16 can optionally include that the transmission opportunity requirements comprise a bandwidth and a duration of a next transmission opportunity of the first AP and the at least one second AP, respectively.

In Example 18, the subject matter of any one of Examples 12-17 can optionally include: scheduling a central frequency location of at least part of the transmission medium for the first AP and the at least one second AP according to the resource sharing policy.

In Example 19, the subject matter of any one of Examples 12-18 can optionally include that the resource sharing policy is based on one of the following: symmetric partial bandwidth sharing, full bandwidth sharing or asymmetric partial bandwidth sharing.

Example 20 is a selection device for primary channel selection by a first access point type communication device (AP) of a group of APs, the selection device comprising: a detector configured to detect a central frequency location and a bandwidth of a primary channel selected by at least one second AP of the group of APs; a controller configured to select a central frequency location and a bandwidth of a primary channel for the first AP, wherein the controller is configured to select the central frequency location and bandwidth of the primary channel for the first AP based on the detected central frequency location and bandwidth of the primary channel for the at least one second AP.

In Example 21, the subject matter of Example 20 can optionally include that the group of APs comprises multiple virtual APs (multi VAPs) or multiple basic service sets (multi BSSs) according to the IEEE 802.11 WiFi standard.

In Example 22, the subject matter of Example 21 can optionally include that the multi VAPs and/or the multi BSSs are allocated to a same device or allocated to a set of distributed devices.

In Example 23 the subject matter of any one of Examples 20-22 can optionally include that the controller is configured to select the central frequency location and bandwidth of the primary channel for the first AP from a section of a transmission medium not occupied by the primary channel of the at least one second AP.

In Example 24, the subject matter of any one of Examples 20-23 can optionally include that the controller is configured to select the central frequency location and bandwidth of the primary channel for the first AP based on a frequency distance relation, e.g. a minimal frequency backoff, with respect to a section of a transmission medium occupied by the primary channel of the at least one second AP.

In Example 25, the subject matter of any one of Examples 20-24 can optionally include that the controller is configured to select the central frequency location and bandwidth of the primary channel for the first AP based on an at least partial overlap with the primary channel of the at least one second AP.

In Example 26, the subject matter of any one of Examples 20-25 can optionally include that the controller is configured to select the central frequency location and bandwidth of the primary channel for the first AP based on closed loop bandwidth and primary channel selection.

In Example 27, the subject matter of Example 26 can optionally include that the controller is configured to select the central frequency location and bandwidth of the primary channel for the first AP based on coordination signaling between the first AP and the at least one second AP.

In Example 28, the subject matter of any one of Examples 26-27 can optionally include that the controller is configured to selecting the central frequency location and bandwidth of the primary channel for the first AP based on coordination signaling between the first AP, the at least one second AP and a central coordinator In Example 29, the subject matter of any one of Examples 20-28 can optionally include that the controller is to select the central frequency location and bandwidth of the primary channel for the first AP based on open loop bandwidth and primary channel selection.

In Example 30, the subject matter of Example 29 can optionally include that the controller is configured to select the central frequency location and bandwidth of the primary channel for the first AP based on previously selected primary channels and bandwidths detected by the detector.

Example 31 is a coordination device for coordinating access to a transmission medium for a group of associated access point type communication devices (APs), the coordination device comprising: a receiver, configured to receive a notification of a planned next transmission opportunity time for accessing the transmission medium by a first AP of the group of APs, and configured to receive a notification of a planned next transmission opportunity time for accessing the transmission medium by a second AP of the group of APs; and a controller, configured to coordinate access to the transmission medium based on the received notifications for the next transmission opportunity times of the first AP and the second AP according to a resource sharing policy.

In Example 32, the subject matter of Example 31 can optionally include that the group of APs comprises multiple virtual APs (multi VAPs) or multiple basic service sets (multi BSSs) according to the IEEE 802.11 WiFi standard.

In Example 33, the subject matter of Example 32 can optionally include that the multi VAPs and/or the multi BSSs are allocated to a same device or allocated to a set of distributed devices.

In Example 34, the subject matter of any one of Examples 31-33 can optionally include that the receiver is configured to receive a notification of transmission opportunity requirements for accessing the transmission medium by the first AP, and configured to receive a notification of transmission opportunity requirements for accessing the transmission medium by the second AP; and that the controller is configured to coordinate the access to the transmission medium based on the received notifications for the transmission opportunity requirements of the first AP and the second AP.

In Example 35, the subject matter of any one of Examples 31-34 can optionally include that the controller is configured to schedule a central frequency location of at least part of the transmission medium for the first AP and the second AP according to the resource sharing policy.

In Example 36, the subject matter of any one of Examples 31-35 can optionally include that the coordination device is implemented in at least one AP of the group of associated access point type communication devices (APs) or in a separate device.

Example 37 is a device for primary channel selection by a first access point type communication device (AP) of a group of APs, the device comprising: means for detecting, by the first AP, a central frequency location and a bandwidth of a primary channel selected by at least one second AP of the group of APs; means for selecting, by the first AP, a central frequency location and a bandwidth of a primary channel for the first AP, wherein the means for selection is configured to perform the selection of the central frequency location and bandwidth of the primary channel for the first AP based on the detected central frequency location and bandwidth of the primary channel for the at least one second AP.

In Example 38, the subject matter of Example 37 can optionally include that the group of APs comprises multiple virtual APs (multi VAPs) or multiple basic service sets (multi BSSs) according to the IEEE 802.11 WiFi standard.

In Example 39, the subject matter of Example 38 can optionally include that the multi VAPs and/or the multi BSSs are allocated to a same device or allocated to a set of distributed devices.

Example 40 is a system for providing primary channel selection for a group of associated access point type communication devices (APs), the system comprising: a first AP, configured to detect a central frequency location and a bandwidth of a primary channel selected by at least one second AP of the group of APs on a transmission medium, wherein the first AP is configured to select a central frequency location and a bandwidth of a primary channel for the first AP on the transmission medium based on the detected central frequency location and bandwidth of the primary channel for the at least one second AP; and at least one second AP, configured to detect a central frequency location and a bandwidth of a primary channel selected by the first AP on the transmission medium, wherein the at least one second AP is configured to select a central frequency location and a bandwidth of a primary channel for the at least one second AP on the transmission medium based on the detected central frequency location and bandwidth of the primary channel for the first AP.

In Example 41, the subject matter of Example 40 can optionally include that the group of APs comprises multiple virtual APs (multi VAPs) or multiple basic service sets (multi BSSs) according to the IEEE 802.11 WiFi standard.

In Example 42, the subject matter of Example 41 can optionally include that the multi VAPs and/or the multi BSSs are allocated to a same device or allocated to a set of distributed devices.

Example 43 is a computer readable non-transitory medium on which computer instructions are stored which when executed by a computer causes the computer to perform the method of any one of Examples 1 to 19.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method for primary channel selection by a first access point type communication device (AP) of a group of APs, the method comprising:
    detecting, by the first AP, a central frequency location and a bandwidth of a primary channel selected by at least one second AP of the group of APs, the primary channel being from among a plurality of frequency-adjacent channels;

selecting, by the first AP, a central frequency location and a bandwidth of a primary channel for the first AP based on the detected central frequency location and bandwidth of the primary channel for the at least one second AP, wherein the primary channel selected for the first AP is the farthest channel from among the plurality of frequency-adjacent channels in terms of frequency from the primary channel selected by the at least one second AP.

2. The method of claim 1, wherein the group of APs comprise multiple virtual APs (multi VAPs) or multiple basic service sets (multi BSSs) according to the IEEE 802.11 WiFi standard.

3. The method of claim 2, wherein one of the multi VAPs or the multi BSSs are allocated to a same device or to a set of distributed devices.

4. The method of claim 1, comprising:

selecting the central frequency location and bandwidth of the primary channel for the first AP from a section of a transmission medium not occupied by the primary channel of the at least one second AP.

5. The method of claim 1, comprising:

selecting the central frequency location and bandwidth of the primary channel for the first AP based on an at least partial overlap with the primary channel of the at least one second AP.

6. The method of claim 1, comprising:

selecting the central frequency location and bandwidth of the primary channel for the first AP in a closed loop manner.

7. The method of claim 6, comprising:

selecting the central frequency location and bandwidth of the primary channel for the first AP based on coordination signaling between the first AP and the at least one second AP.

8. The method of claim 6, comprising:

selecting the central frequency location and bandwidth of the primary channel for the first AP based on coordination signaling between the first AP, the at least one second AP, and a central coordinator.

9. The method of claim 1, comprising:

selecting the central frequency location and bandwidth of the primary channel for the first AP in an open loop manner.

10. The method of claim 9, comprising:

selecting the central frequency location and bandwidth of the primary channel for the first AP based on detection of previously-selected primary channels and bandwidths.

* * * * *